United States Patent
Kim (10) Patent No.: US 7,062,367 B2
(45) Date of Patent: Jun. 13, 2006

(54) VEHICLE ACTUATOR REMOTE CONTROL SYSTEM

(76) Inventor: Boo Y Kim, 13927 E. Amar Rd., La Puente, CA (US) 91746

( * ) Notice: Subject to any disclaimer, the term of this patent is extended or adjusted under 35 U.S.C. 154(b) by 859 days.

(21) Appl. No.: 09/961,811

(22) Filed: Sep. 25, 2001

(65) Prior Publication Data

US 2003/0060906 A1    Mar. 27, 2003

(51) Int. Cl.
*G06F 7/00*    (2006.01)
*B60G 17/18*    (2006.01)

(52) U.S. Cl. .............................. 701/37; 701/2; 701/36; 446/456; 340/825.69; 340/825.72; 280/5.503

(58) Field of Classification Search .................... 701/1, 701/2, 36, 37; 280/5.5, 5.515, 6.15, 6.151, 280/6.157, 43, 124.1, 124.134; 340/825.69, 340/825.71, 825.72, 825.73; 446/454–456, 446/465–466
See application file for complete search history.

(56) References Cited

U.S. PATENT DOCUMENTS

| | | | |
|---|---|---|---|
| 3,827,538 A | 8/1974 | Morgan | 188/319.1 |
| 4,364,574 A | 12/1982 | Saito | 280/6.157 |
| 4,683,992 A | 8/1987 | Watanabe | 188/266.5 |
| 4,830,395 A | 5/1989 | Foley | 280/698 |
| 4,872,702 A | 10/1989 | Medley | 280/6.159 |
| 5,527,059 A * | 6/1996 | Lee, Jr. | 446/466 |
| 5,661,651 A * | 8/1997 | Geschke et al. | 701/88 |
| 5,745,033 A | 4/1998 | Jenkins, Jr. et al. | 340/426.18 |
| 5,785,576 A * | 7/1998 | Belton | 446/456 |
| 6,715,778 B1 * | 4/2004 | Gottschalk et al. | 280/124.157 |
| 6,848,968 B1 * | 2/2005 | Weiss et al. | 446/454 |
| 2002/0190872 A1 * | 12/2002 | Suman et al. | 340/825.69 |
| 2004/0130457 A1 * | 7/2004 | Ueda et al. | 340/825.72 |

* cited by examiner

Primary Examiner—Jacques H. Louis-Jacques
(74) Attorney, Agent, or Firm—John K. Park; Park Law Firm (57) ABSTRACT

The control system includes a microprocessor based radio frequency receiver module and a radio frequency handset transmitter module. The microprocessor receives a specific input from the remote transmitter. The handset transmitter module contains two joysticks. Two different sets of eight peripheral initiating positions are located in a circular formation with one of the joysticks at the center of each circular formation. Each initiating position activates a switch. Each switch activates a different radio frequency (RF) signal that activates a particular vehicle actuator.

11 Claims, 7 Drawing Sheets

FIG. 2

Basic Layout of the Transmitter MODULE

Basic Layout of the Receiver MODULE

Examples of signal distribution from the microprocessor to the outputs to relays.

Wiring to Up Relays

Wiring to Actuators

Wiring to Down Relays

Wiring to Actuators

FIG. 2a

FIG. 3 Typical Pneumatic Lift System

Examples of how a Pneumatic or Hydraulic Actuator is placed on a vehicle.

The upper control arm and frame mounting points have been ommited from the drawings due to the multiplicity of types.

Example of mounting of actuator on a truck or heavy vehicle using a standard shock absorber with unequal length control arms.

FIG. 6b

Example of mounting of actuator on a light truck or vehicle using a MacPhearson strut type of mounting system

VEHICLE ACTUATOR REMOTE CONTROL SYSTEM

BACKGROUND

The present invention relates to control systems for controlling vehicle height or controlling shock absorbers. More particularly the present invention pertains to control systems for controlling vehicle actuators that control the up and down motion of a vehicle.

Present controller systems for vehicle actuators include a set of up to eighteen buttons or levers. Each lever is manually pushed to activate a particular vehicle actuator. It requires a great amount of coordination and timing to accomplish a smooth sequence of operation when each lever must be manually activated and then deactivated, while also activating the subsequent lever. Simultaneous operation of two vehicle actuators requires the controller system operator to push both levers with the same hand or to use two hands, one on each lever. If one hand is used and the levers are located a distance from each other, there is a slight elapse of time between the operation of the levers. The elapse in time prevents a smooth and substantially simultaneous operation of the vehicle actuators.

Some present control systems are remote from the vehicle. These remote control systems use a hardwire. A signal carrying wire travels from the transmitter module to the receiver module within the vehicle. The operator stands near the outside of the vehicle and performs the up and down motions of the vehicle actuators. The length of the wire limits the distance that the transmitter operator is removed from the vehicle.

U.S. Pat. No. 4,683,992 discloses a vehicle suspension system with remote control. A fluid controller is operated in conjunction with the suspension assembly. The invention includes a piston rod with means for receiving pressure signals from a fluid controller and a piston assembly attached to one end of the piston rod. A purpose of the system is to provide a controller for better ride control.

U.S. Pat. No. 4,364,574 discloses a vehicle height adjustment apparatus. A selector switch is used to select from a plurality of referential heights. A purpose of the invention is to allow increased vehicle height when traveling over rough unpaved roads.

These prior devices do not allow for the rapid control with a single hand of multiple vehicle actuators. These devices do not facilitate the quick operation of multiple vehicle actuators rapidly in sequence. The prior art devices often focus on the control of vehicle shock absorbers or vehicle height for the purpose of vehicle stability and safety. The existing devices are not designed for wireless individualized control of multiple actuators on the car, from a location that is remote from the car.

Therefore, there is a need for a wireless remote controlled vehicle actuator control system that allows the simultaneous operation of multiple vehicle actuators. There is also a need for a control system that has a pre-programmed automatic sequence of multiple vehicle actuator movements. The control system should be operable from a remote wireless location, outside of the vehicle.

SUMMARY

An objective of the present invention is a vehicle actuator control system that allows the simultaneous operation of numerous vehicle actuators. Another objective of the invention is a control system that is pre-programmed to provide an automatic sequence of multiple vehicle actuator movements.

Another objective of the vehicle actuator control system is including a transmitter module and a receiver module for remote wireless location operation. An operator using the transmitter module outside of the vehicle can send a radio frequency signal to a receiver module inside of the vehicle. The receiver module controls the movements of the vehicle actuators located on the vehicle.

The control system includes a microprocessor based radio frequency receiver module contained in a molded plastic housing and a radio frequency handset transmitter module. The microprocessor receives a specific input from the remote transmitter module. Both the receiver module and transmitter module form a package that is coded to work together in tandem.

The handset transmitter module contains two joysticks, two contact surfaces or buttons, a radio frequency transmitter unit and a power supply. The handset transmitter module also has a molded plastic housing. Two different sets of eight peripheral initiating positions are located in a circular formation with one of the joysticks at the center of each circular formation. Each initiating position activates a switch. Each switch activates a different radio frequency (RF) signal from the RF transmitter unit to the RF receiver unit. The RF receiver unit is connected to the microprocessor. The signal activates a particular output or combination of outputs from the receiver microprocessor. Each output sends a trigger signal to a relay. Each relay activates a particular vehicle actuator.

The microprocessor converts the received input into a set of output commands that initiate a trigger signal to one or more relays. The trigger signal energizes the relays. Each of the relays operates an individual vehicle actuator, thus producing either an up or down motion of a portion of the vehicle by the vehicle actuator. The vehicle actuator extends to produce an upward motion and the vehicle actuator contracts to produce a downward motion. The vehicle actuators can be of a pneumatic type or the hydraulic type. The coordinated movement of two vehicle actuators at the same time is substantially simultaneous. The movements appear to be simultaneous to a spectator or passenger of the vehicle.

The joysticks with the adjacent circular arrangement of peripheral initiating positions provides a convenient and fast method of operating multiple vehicle actuators. The contact surface buttons are located near the joysticks, where the contact surface buttons can be easily pressed to activate an autorotation sequence of all of the vehicle actuators. The microprocessor provides preprogrammed sequences of vehicle actuators movements. The handset transmitter module allows remote operation of the vehicle actuators. These features create a controller system for vehicle actuators that is effective, fast and entertaining.

Although the present invention is briefly summarized, a fuller understanding of the invention can be obtained from the following drawings, detailed description and appended claims.

BRIEF DESCRIPTION OF THE DRAWINGS

These and other features, aspects and advantages of the present invention will become better understood with reference to the accompanying drawings, wherein:

FIG. 4 is a schematic diagram of the transmitter module.

DETAILED DESCRIPTION OF THE PREFERRED EMBODIMENTS

Referring to FIGS. 1 through 7, the remote vehicle actuator control system 20 includes a transmitter module 22 with two multi-function levers 24, 26 and two contact surfaces 28, 30. Each lever 24, 26 has a plurality of peripheral initiating positions 32. Each initiating position 32 activates a switch 34 that initiates a different radio frequency signal. In this embodiment the levers 24, 26 are joysticks and the contact surfaces 28, 30 are buttons. Two different sets of eight peripheral initiating positions 32 are located in a circular formation with one of the joystick levers 24, 26 at the center of each circular formation. Each joystick lever 24, 26 provide quick and easy initiation of eight different peripheral initiating positions 32. The two contact surface buttons 28, 30, with their associated initiating positions 32, each initiate a different autorotation sequence of the vehicle actuators 100. There are a total of eighteen initiating positions 32 numbered 1 (one) through 18 (eighteen). Sixteen peripheral initiating positions 32 around the joystick levers 24, 26 and two more initiating positions 32 at the contact surface buttons 28, 30.

Figure 1:
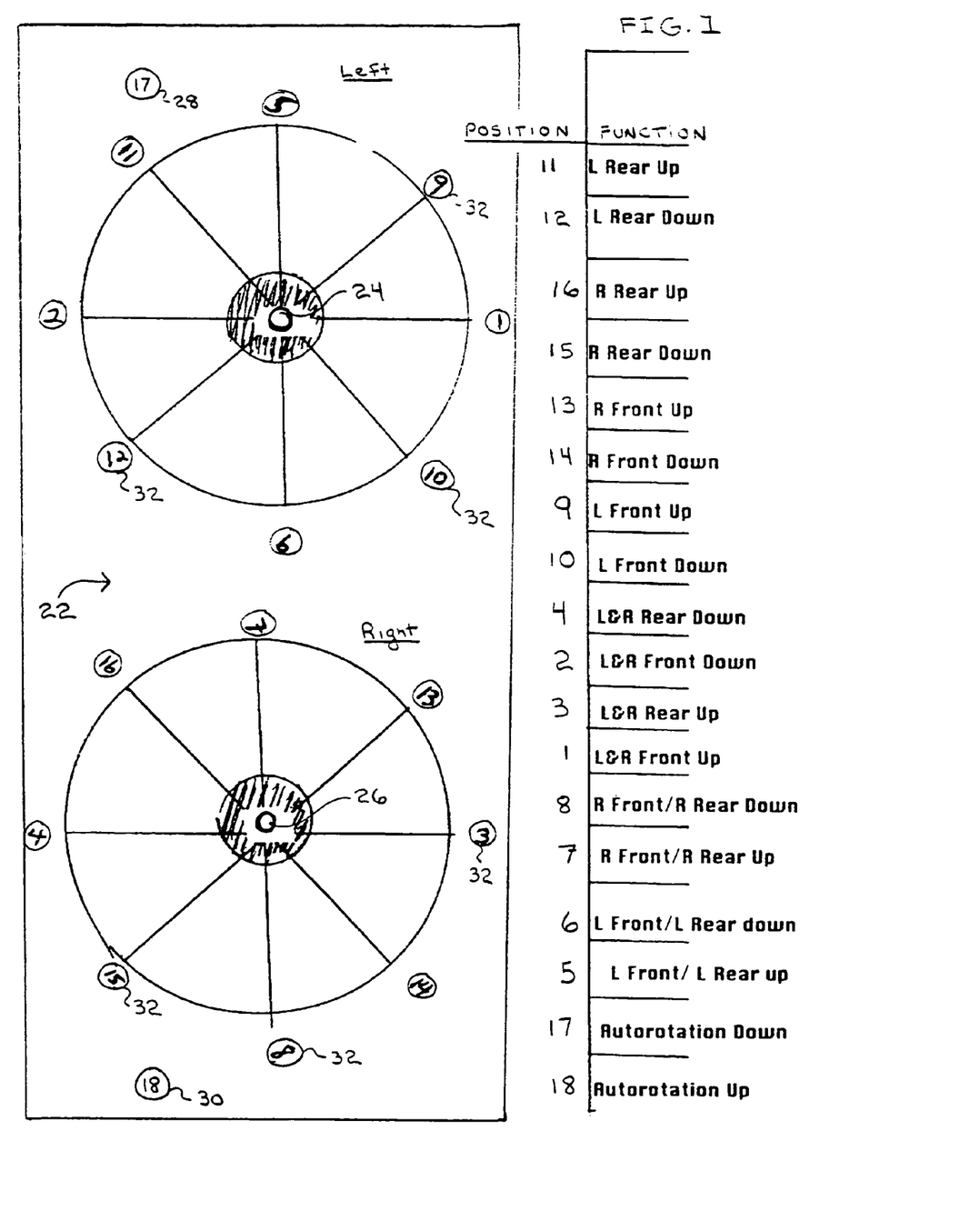
FIG. 1 is top view of the transmitter module showing the joysticks and contact surface buttons.

Transmitter module 22 initiates remote operation of the receiver module 42 and the vehicle actuators 100. A short movement of the operator's hand brings the joystick lever 24, 26 into operating contact with any one of the adjacent eight peripheral initiating positions 32. The operator can rotate the joystick levers 24, 26 in a circular motion, which operates the initiating positions 32 and the corresponding vehicle actuators 100 rapidly in sequence. Prior methods of control systems required the activation of numerous buttons to initiate multiple operations of the vehicle actuators 100.

The microprocessor 36 that controls the movement of the vehicle actuators 100 can be programmed to initiate a variety of sequences. The contact surface buttons 28, 30 initiate a vehicle actuator 100 sequence movement that is exemplary of the complexity of automatic vehicle actuator movements that can be programmed into the microprocessor 36. Present methods of controlling the vehicle actuators 100 include a series of eighteen buttons or levers that must be manually moved to initiate the vehicle actuators 100. Prior methods require a great amount of coordination and timing to accomplish a smooth sequence of operation when each lever must be manually activated and then deactivated, while also activating the subsequent lever.

Figures 2, 2A:
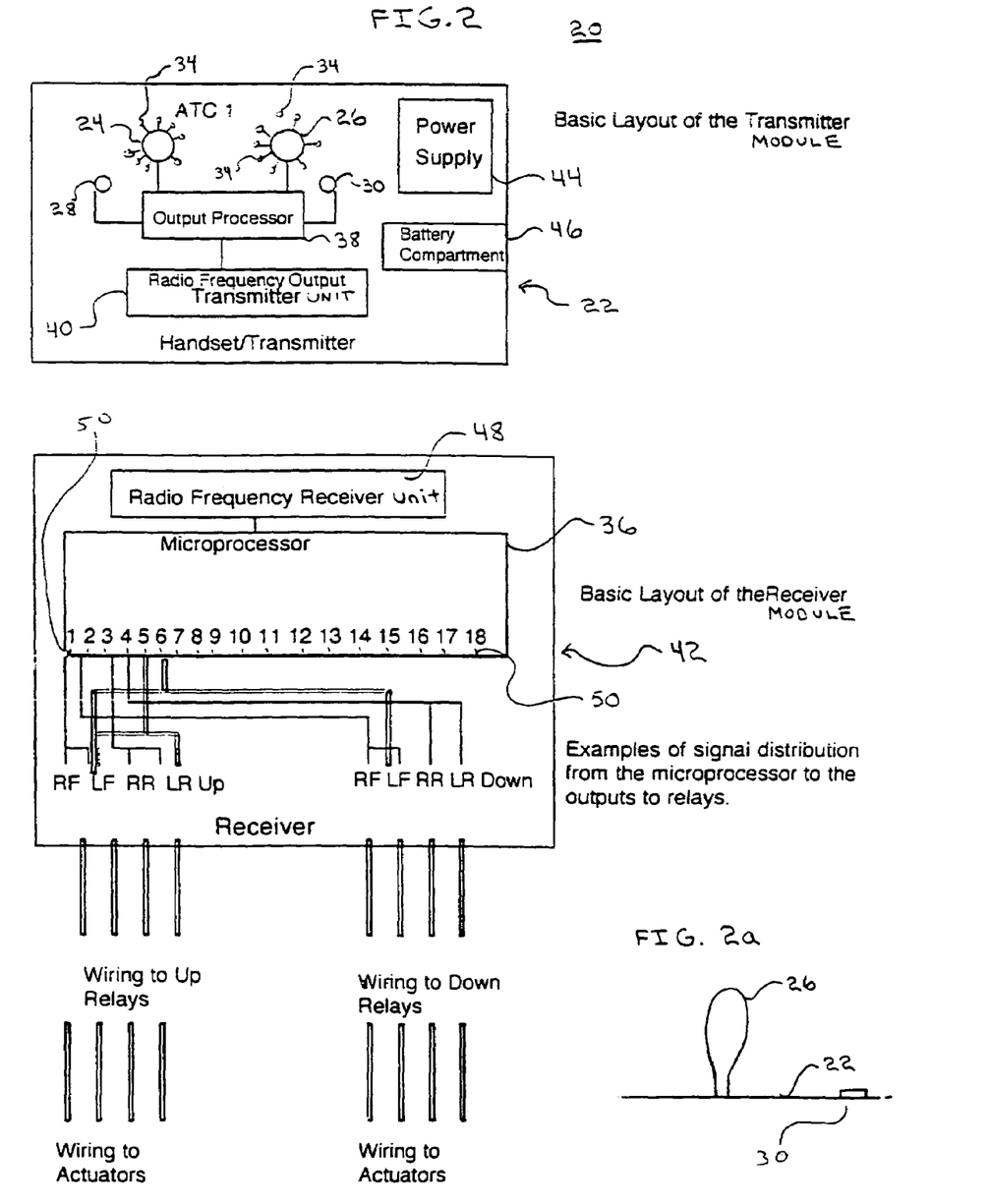
FIG. 2 is top view of the internal components of the transmitter module and receiver module.
FIG. 2a is a front view of the right joystick and contact surface.

Referring particularly to FIG. 2, the transmitter module 22 includes an output processor 38 and a radio frequency output transmitter unit 40. The output processor 38 is connected to the two joystick levers 24, 26 and the two contact surfaces 28, 30. The joystick levers 24, 26 and contact surfaces 28, 30 initiate switches 34 that send an input to the output processor 38.

The output processor 38 receives the inputs from the two joystick levers 24, 26 and the two contact surfaces 28, 30, via the switches 34. The output processor 38 is operatively connected to the radio frequency output transmitter unit 40. The radio frequency output transmitter unit 40 transmits the radio frequency signals to the receiver module 42. A power supply 44 and battery compartment 46 are located within the transmitter module 22 for supplying power to the output processor 38 and the radio frequency output transmitter unit 40.

Figure 3:
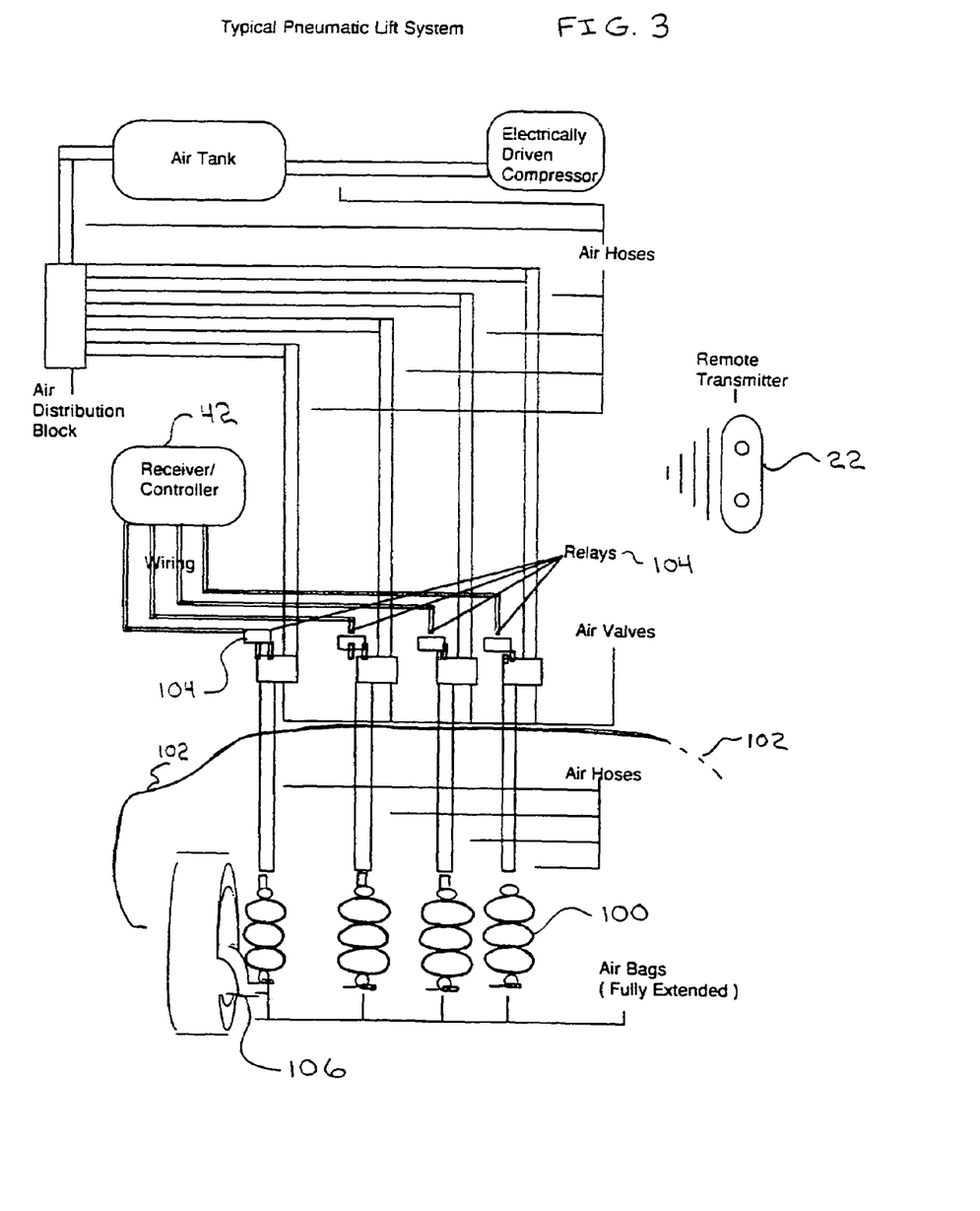
FIG. 3 is an exploded view of the vehicle actuator in a typical pneumatic lift system.
Figure 5:
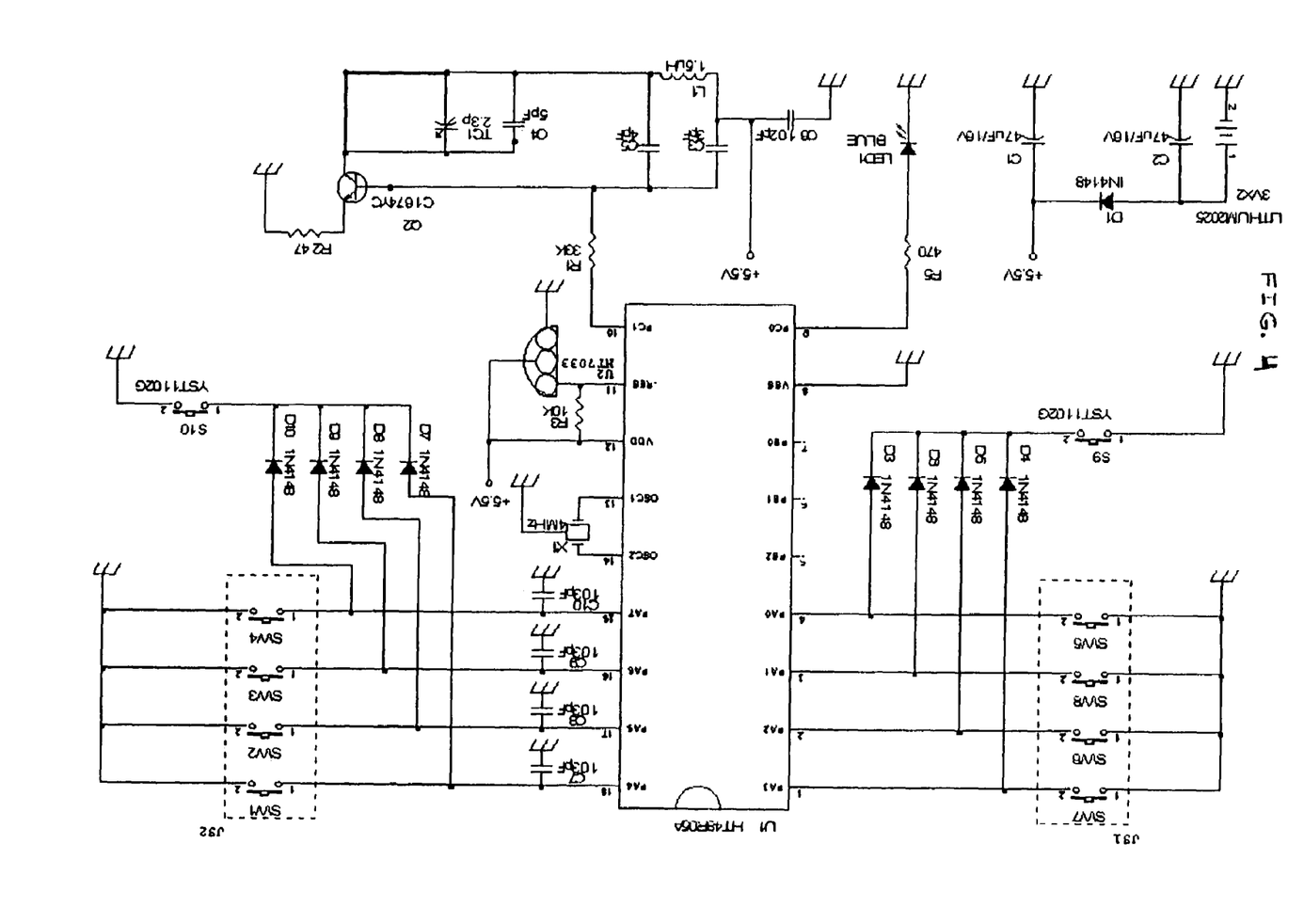
FIG. 5 is a schematic diagram of the receiver module.
Figure 6A:
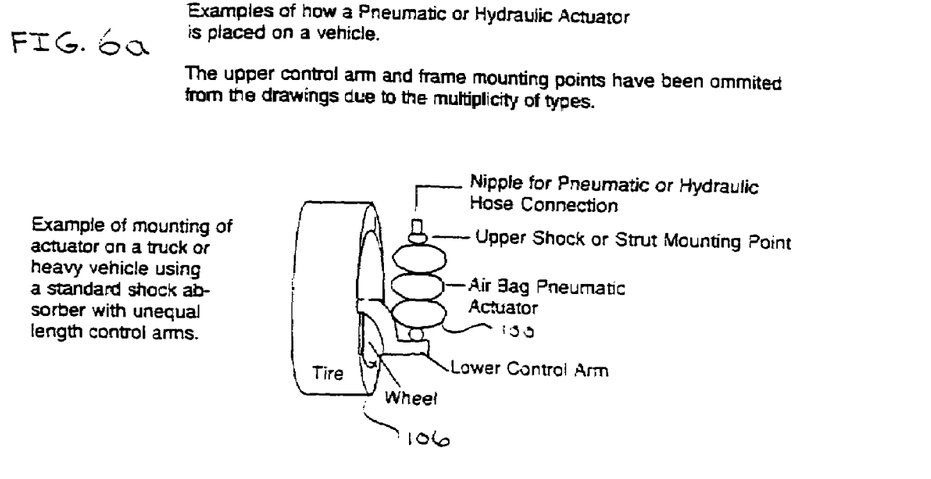
FIG. 6a is an example of an air bag style pneumatic actuator mounted on a vehicle wheel.
Figure 6B:
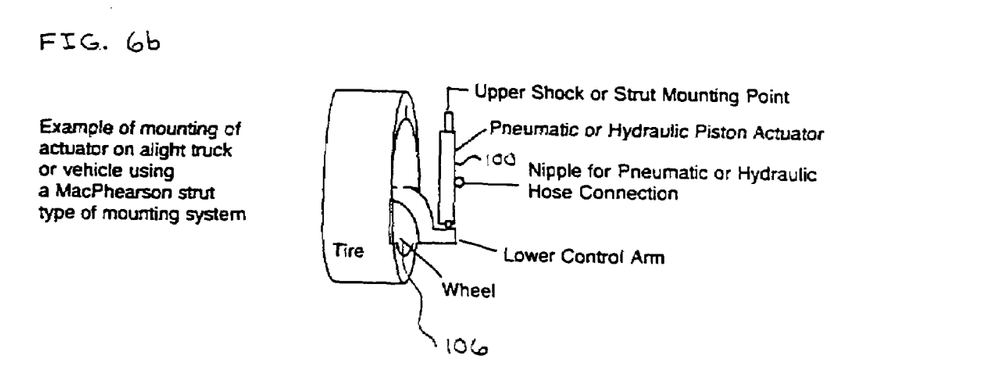
FIG. 6b is an example of a vehicle-mounted actuator that is pneumatic or hydraulic.

The receiver module 42 receives the radio frequency signals. The receiver module 42 includes a radio frequency receiver unit 48, a microprocessor 36, and output ports 50. The radio frequency receiver unit 48 receives the radio frequency signal and transmits the radio frequency signal to the microprocessor 36. The microprocessor 36 converts the signal to a set of commands that initiate one or more output ports 50. The output ports 50 can be operatively connected to initiate vehicle actuators 100 on the vehicle 102. A relay 104, shown in FIG. 3, is interposed between the output ports 50 and the vehicle actuators 100.

Each peripheral initiating position 32 initiates a different sequence of actions by one or more of the vehicle actuators 100. Each vehicle actuator 100 can control the up and down motion of the vehicle 102 near a vehicle wheel 106. Commonly each peripheral initiating position 32 initiates just one or two vehicle actuators 100. The entire front or rear of the vehicle 102 can be lowered or raised, when two vehicle actuators 100 are operated substantially simultaneously. Similarly, the left side of the vehicle 104 at both the front and rear wheel areas could be lowered or raised, by actuating two of the vehicle actuators 100. A different peripheral initiating position 32 can send a signal to the microprocessor 36 that elicits the action of lowering or raising the right side of the vehicle 104 at both the front and rear wheel areas. These are just some of the numerous combinations of vehicle actuator movements that can be pre-programmed into the microprocessor 36.

The vehicle actuator control system 20 simplifies the operation of vehicle actuators 100, through the use of a joystick lever 24, 26 to operate numerous peripheral initiating positions 32 and the microprocessor 36 to program simultaneous outputs to multiple vehicle actuators 100. The vehicle actuator control system 20 expands the capability of the control system operator to perform complex maneuvers of the vehicle actuators 100.

Referring to FIG. 1, an embodiment of the present invention is constructed with the following operations. Following the clockwise direction, the left joystick 24 activates peripheral initiating positions one, ten, six, twelve, two, eleven, five, and nine. Following in clockwise direction, the right joystick 26 activates peripheral initiating positions three, fourteen, eight, fifteen, four, sixteen, seven, and thirteen.

The peripheral initiating positions 32 perform the following operations. Peripheral initiating position one creates an upward movement of the left front and right front vehicle actuators 100. Initiating position two creates a simultaneous downward movement of the left-front and right-front vehicle actuators 100. Initiating position three creates a simultaneous upward movement of the left-rear and right-rear vehicle actuators 100. Initiating position four creates a simultaneous downward movement of the left-rear and right-rear vehicle actuators 100.

Position number five initiates a simultaneous upward movement of the left-front and left-rear vehicle actuators 100. Position number six initiates a simultaneous downward movement of the left-front and left-rear vehicle actuators 100. Position number seven initiates a simultaneous upward movement of the right-front and right-rear vehicle actuators 100. Position number eight initiates a simultaneous downward movement of the right-front and right-rear vehicle actuators 100. Position number nine initiates an upward movement of the left-front actuator 100. Position number ten initiates a downward movement of the left-front actuator 100.

Initiating position eleven creates an upward movement of the left-rear vehicle actuator 100. Initiating position twelve creates a downward movement of the left-rear vehicle actuator 100. Initiating position thirteen creates an upward movement of the right-front vehicle actuator 100. Initiating position fourteen creates a downward movement of the right-front vehicle actuator 100. Initiating position fifteen creates a downward movement of the right-rear vehicle actuator 100. Initiating position sixteen creates an upward movement of the right rear vehicle actuator 100.

Initiating position seventeen starts the automatic rotating sequence of vehicle actuator movements that causes a downward motion to each to vehicle actuators 100, one at a time, thus creating an up-down motion around the vehicle 102. The microprocessor 36 is preprogrammed to control the rotating up-down sequence of the vehicle actuators 100. In a similar manner, initiating position eighteen starts the automatic rotating sequence of vehicle actuator movements that produce an upward motion to each to vehicle actuators 100, one at a time, rotating around the vehicle 102.

Figure 7A:
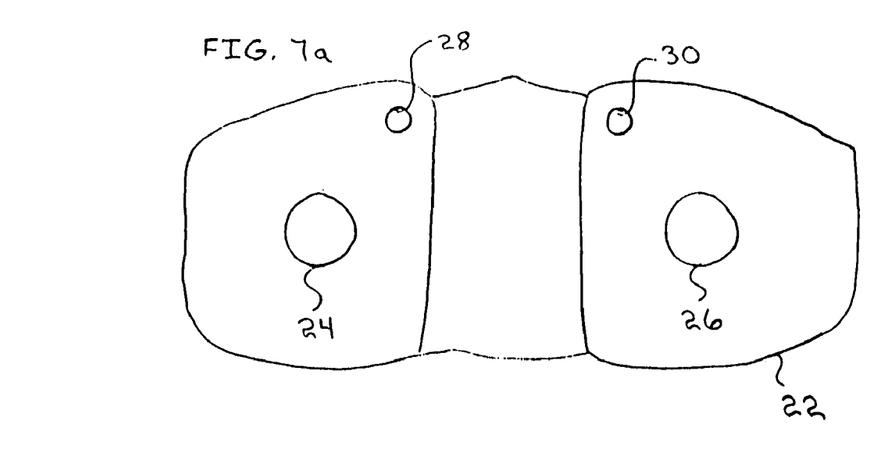
FIG. 7a illustrates a top view of the transmitter module.
Figure 7B:
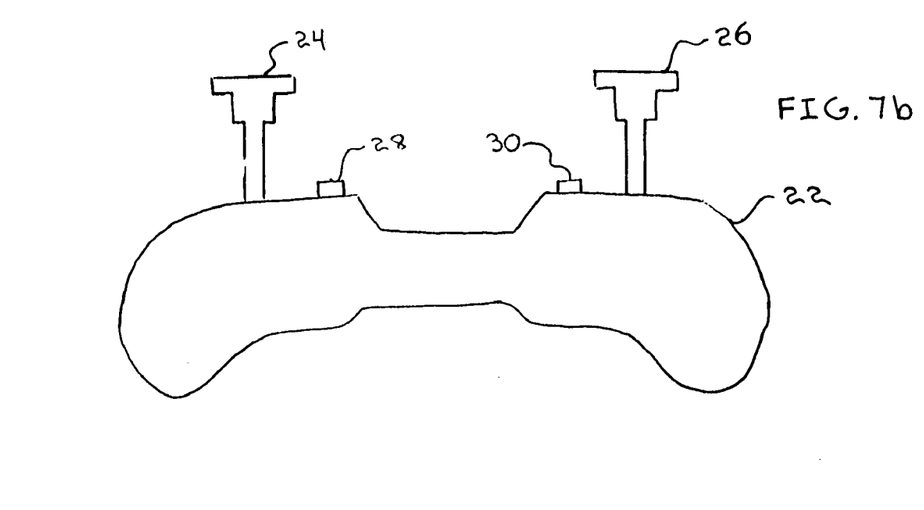
FIG. 7b illustrates a front view of the transmitter module.
Figure 7C:
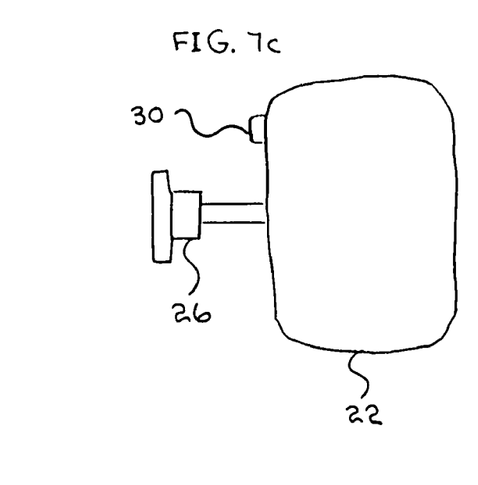
FIG. 7c illustrates a side view of the transmitter module.

Referring to FIGS. 7a through 7c, views of the transmitter module 22 are illustrated. FIG. 7a is a top view, FIG. 7b is a front view, and FIG. 7c shows a side view. Although not shown, one version of this embodiment does not have contact surface buttons 28, 30. The autorotation sequences are initiated by pushing downward on the corresponding joystick lever 24, 26.

The joystick levers 24, 26 with the adjacent circular arrangement of peripheral initiating positions 32 provides a convenient and fast method of operating multiple vehicle actuators 100. The contact surface buttons 28, 30 are located near the joystick levers 24, 26, where the contact surface buttons 28, 30 can be easily pressed to activate an autorotation sequence of all of the vehicle actuators 100. The microprocessor 36 provides preprogrammed sequences of vehicle actuators 100 movements. The handset transmitter module 22 allows remote operation of the vehicle actuators 100. These individual characteristics and combination of features provide a vehicle actuator controller system 20 that is easy and quick to operate for the controller operator. The resulting movements of the vehicle create an entertaining display for spectators and vehicle passengers.

Although the present invention has been described in considerable detail with regard to the preferred versions thereof, other versions are possible. Therefore, the appended claims should not be limited to the descriptions of the preferred versions contained herein.

What is claimed is:

1. A vehicle actuator control system for controlling the vertical movement of the four corners of a vehicle, comprising:
  a) a transmitter module having a multi-function lever, wherein the multi-function lever having a plurality of peripheral initiating positions, wherein each initiating position activates a switch that initiates a different radio frequency signal; and
  b) a receiver module for receiving the radio frequency signals, the receiver module having a radio frequency receiver unit, a microprocessor and output ports, wherein the radio frequency receiver receives a radio frequency signal and transmits the radio frequency signal to the microprocessor, wherein the microprocessor converts the signal to a set of commands that initiate one or more output ports, and wherein the output ports are operatively connected to initiate vehicle actuators on the vehicle;

wherein each peripheral initiating position initiates a different action by one or more of the vehicle actuators, and whereby each vehicle actuator controls the up and down motion of the vehicle near a vehicle wheel, wherein the lever is a joystick, wherein the joystick having an inoperative central position and four or more peripheral initiating positions, wherein the joystick having eight peripheral initiating positions, wherein the vehicle actuator control system further comprises a contact surface, wherein the contact surface activates a switch that initiates a radio frequency signal, wherein the radio frequency signal initiates an auto-rotation sequence by the vehicle actuators.

2. The vehicle actuator control system of claim 1, wherein a peripheral initiating position is designation position number one, wherein position number one initiates a simultaneous upward motion of a left-front vehicle actuator and a right-front vehicle actuator.

3. A vehicle actuator control system for controlling the vertical movement of the four corners of a vehicle, comprising:
  a) a transmitter module having a plurality of multi-function levers, wherein the multi-function levers having a plurality of peripheral initiating positions, wherein each initiating position activates a switch that initiates a different radio frequency signal; and
  b) a receiver module for receiving the radio frequency signals, the receiver module having a radio frequency receiver unit, a microprocessor and output ports, wherein the radio frequency receiver receives a radio frequency signal and transmits the radio frequency signal to the microprocessor, wherein the microprocessor converts the signal to a set of commands that initiate one or more output ports, and wherein the output ports are operatively connected to initiate vehicle actuators on the vehicle;

wherein each peripheral initiating position initiates a different action by one or more of the vehicle actuators, and whereby each vehicle actuator controls the up and down motion of the vehicle near a vehicle wheel, wherein the levers are joysticks, wherein there are two joysticks designated left joystick and right joystick, wherein each of the left joystick and the right joystick having an inoperative central position and four or more peripheral initiating positions, wherein the vehicle actuator control system, further comprises two contact surfaces, wherein each contact surface activates a switch that initiates a radio frequency signal, wherein the radio frequency signal initiates an auto-rotation sequence by the vehicle actuators, wherein the initiating positions of the contact surfaces are designated by unit numbering of seventeen and eighteen, wherein position seventeen initiates an auto-rotation sequence of downward motions in the vehicle actuators, and wherein position eighteen initiates an auto-rotation sequence of upward motions in the vehicle actuators.

4. The vehicle actuator control system of claim 3, wherein each of the left joystick and the right joystick having eight peripheral initiating positions; wherein the sixteen initiating positions are designated by unit numbering of one through sixteen.

5. The vehicle actuator control system of claim 4, wherein position number six initiates a downward movement of the left-front and left-rear vehicle actuators.

6. The vehicle actuator control system of claim 5, wherein position number seven initiates an upward movement of the right-front and right-rear vehicle actuators.

7. The vehicle actuator control system of claim 6, wherein position number eight initiates a substantially simultaneous downward movement of the right-front and right-rear vehicle actuators.

8. The vehicle actuator control system of claim 7, wherein position number nine initiates an upward movement of the left-front actuator.

9. The vehicle actuator control system of claim 8, wherein position number ten initiates a downward movement of the left-front actuator.

10. The vehicle actuator control system of claim 9, wherein position number sixteen initiates an upward movement of the right-rear actuator.

11. The vehicle actuator control system of claim 10, wherein the contact surface designated as seventeen is located adjacent to the left joystick lever.

* * * * *